US007921549B2

(12) United States Patent
Chawgo et al.

(10) Patent No.: US 7,921,549 B2

(45) Date of Patent: Apr. 12, 2011

(54) TOOL AND METHOD FOR CONNECTING A CONNECTOR TO A COAXIAL CABLE

(75) Inventors: Shawn M. Chawgo, Cicero, NY (US); Jeremy Amidon, Marcellus, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 662 days.

(21) Appl. No.: 11/900,104

(22) Filed: Sep. 10, 2007

(65) Prior Publication Data

US 2009/0064490 A1 Mar. 12, 2009

(51) Int. Cl.
*H01R 43/042* (2006.01)
*H02G 1/12* (2006.01)

(52) U.S. Cl. ................ 29/753; 29/743; 29/748; 29/749; 29/755; 29/33 M; 81/9.4

(58) Field of Classification Search .................... 29/753, 29/743, 748, 749, 757, 744, 751, 755, 33 M; 439/394, 445, 495, 499, 578; 424/43, 45; 72/712, 442, 20.1, 20.5; 81/9.4, 3.41
See application file for complete search history.

(56) References Cited

U.S. PATENT DOCUMENTS

| | | | | |
|---|---|---|---|---|
| 3,315,337 | A | 4/1967 | Stull | |
| 3,365,927 | A | 1/1968 | Lynch | |
| 3,374,521 | A * | 3/1968 | Clarke | 29/890.11 |
| 4,774,762 | A | 10/1988 | Gobeil | |
| 5,392,508 | A | 2/1995 | Holliday et al. | |
| 5,550,059 | A * | 8/1996 | Boger et al. | 436/54 |
| 5,596,800 | A | 1/1997 | Holliday et al. | |
| 5,743,131 | A | 4/1998 | Holliday et al. | |
| 6,026,897 | A * | 2/2000 | Pringle et al. | 166/65.1 |
| 6,112,404 | A * | 9/2000 | Tarpill | 29/751 |
| 6,116,069 | A * | 9/2000 | Holliday | 72/21.6 |
| 6,227,030 | B1 | 5/2001 | Lefavour et al. | |
| 6,363,560 | B1 * | 4/2002 | Kesinger | 7/107 |
| 6,769,173 | B2 | 8/2004 | Chadbourne | |
| 7,096,573 | B2 | 8/2006 | Holliday | |

FOREIGN PATENT DOCUMENTS

| | | |
|---|---|---|
| GB | 1072418 | 6/1967 |

* cited by examiner

*Primary Examiner* — Derris H Banks
*Assistant Examiner* — Tai Nguyen
(74) *Attorney, Agent, or Firm* — Schmeiser, Olsen & Watts, LLP

(57) ABSTRACT

A tool for changing first and second parts of a connector from a pre-assembly relationship into an assembled relationship. The tool is portable and has a frame with an operating mechanism thereon. The operating mechanism has a plunger that is movable to thereby change the relationship of the connector parts. The operating mechanism is operable by a pressurized fluid within a container that is connected to the frame.

23 Claims, 7 Drawing Sheets

TOOL AND METHOD FOR CONNECTING A CONNECTOR TO A COAXIAL CABLE

BACKGROUND OF THE INVENTION

1. Field of the Invention

This invention relates to connectors for cable, such as coaxial cable and, more particularly, to a compression tool for operatively attaching a connector to the cable. The invention is also directed to a method of using such a compression tool.

2. Background Art

Connectors are operatively attached to cables used for a multitude of purposes in many different environments. A particularly high volume of such connectors is attached to coaxial cable for its various applications. The coaxial cable may be sold with pre-attached connectors, thereby requiring connector attaching tools at a cable manufacturing facility, or a separate facility at which the cable is staged for attachment of the connectors. These tools must be capable of consistently and reliably attaching the connectors on a high volume basis. Stationary, non-portable tools may be provided for this purpose, as shown for example in U.S. Pat. No. 6,116,069, to Holliday. Since portability is not a concern, tools of this type can be made with high strength, and potentially heavy, components with the ability to produce a large compressive attaching force, as in a direction parallel to the cable length, between connector parts.

More commonly, cable is cut to length and connectors attached thereto in the field. This process may be carried out by a homeowner, but is performed on a much greater volume by professionals that move from site to site to effect repairs and/or installations of equipment requiring coaxial cable connection.

Portable compression and crimping tools used for this purpose are available with different capacity and quality. A homeowner may purchase such a tool, adequate to meet limited demands, relatively inexpensively. Tools of this type are generally constructed with mechanical components that rely upon the application of a significant gripping force by a user for their successful operation. The nature and quality of the connection is dictated by the particular application force produced through this gripping action. Inconsistent force application may result in connections with different integrity. It may be impossible for certain individuals to reliably generate a force of sufficient magnitude that will adequately maintain the attachment of certain connectors to a cable. Users with the requisite hand strength may eventually suffer from fatigue after repeated use of the tools, whereby the quality of the connections may eventually suffer. Such basic tools thus become impractical for professional users that may be required to attach a multitude of connectors in the course of a day.

While higher end tools with greater mechanical advantage are available to professionals, a number of the above problems still persist. Failed or compromised connections can have a significant financial impact on a business if experienced in any significant volume. In the highly competitive cable industry, where margins for installations are relatively small, such failures not only necessitate follow up visits and repairs, but may also significantly impact the reputation of the installing company.

The above problems are aggravated by the fact that many new types of connectors are requiring even greater attaching forces, particularly those that must be attached using compression tools that exert compressive forces aligned lengthwise/axially with respect to the cable. So long as the integrity of the connector attachment depends upon the degree of force applied by the user, and the available tools permit inconsistent force application, the above problems, particularly inconsistent quality and user fatigue, will persist.

Tools for attaching cable connectors, that are operable using mechanical assistance, are known. It is known to apply connecting forces hydraulically or pneumatically on equipment at a fixed location in a manufacturing facility, as seen for example in U.S. Pat. No. 6,116,069, to Holliday.

It is also known to hydraulically and pneumatically drive crimping tool components on units that are portable in nature to exert radial crimping forces on connectors, as shown for example in U.S. Pat. No. 4,774,762, to Gobeil. This tool is limited to producing radial crimping forces and is also relatively complicated in nature. This makes this type of equipment generally expensive and prone to failure. It may thus be impractical for use on a high volume basis for on site installations.

In spite of its maturity, the industry has not developed a feasible compression tool construction that mechanically assists the application of axial connecting forces and has a geometry that makes transportation thereof and on site use practical on a high volume basis. Thus, for on site applications, the industry has continued to use the basic hand held tool that relies solely upon forces generated by a user's hand(s).

SUMMARY OF THE INVENTION

The invention consists of a tool for connecting a coaxial cable connector to a coaxial cable. The coaxial cable connector has a central axis and first and second parts that are movable relative to each other along the central axis of the connector between: i) a pre-assembly relationship; and ii) an assembled relationship. The tool has a frame defining a receptacle for the connector with the connector in an installation position and a part of the cable placed in an operative position with respect to the connector. An operating mechanism on the frame has a plunger that is movable between a first position and a second position to thereby change the first and second parts of the connector in the installation position from the pre-assembly relationship into the assembled relationship. The operating mechanism is actuated by a pressurized fluid from a container removably connected to the frame.

In one form, the tool is provided in combination with a container for a supply of pressurized fluid that is removably connected to the frame.

In one form, the frame defines a grasping portion that can be gripped in the hand of a user to hold the tool for operation and an operator having a part that can be repositioned from a first position towards a second position to thereby release fluid from the pressurized supply to cause the plunger to be moved from its first position towards its second position.

In one form, the part is in the form of a trigger that is translated along a line between its first and second positions. The trigger is operable by a finger of a user on a hand that is gripping the grasping portion of the frame.

In one form, the frame defines a chamber within which the plunger is guided in movement along a first line between its first and second positions and the frame defines a fluid flow path between a pressurized supply of the fluid and a force applying end on the plunger.

In one form, the operating mechanism further has a valve assembly that controls passage of fluid from a pressurized supply of the fluid to the force applying end of the plunger.

In one form, the tool is provided in combination with a container for a supply of pressurized fluid that is air. The container is removably connected to the frame.

In one form, the valve assembly has a valve element that is movable between a flow blocking position and a flow passage position. The valve element is movable by a user through a trigger that is engagable and repositionable by a user to thereby move the valve element from the flow blocking position into the flow passage position.

In one form, the trigger moves as one piece with the valve element.

In one form, the valve element is translatable between the flow blocking and flow passage positions along a second line that is substantially parallel to and spaced from the first line.

In one form, the frame defines a grasping portion that can be gripped in a hand of a user to hold the tool for operation. The trigger is situated to be operable by a finger of a user on a hand that is gripping the grasping portion of the housing.

In one form, the tool is provided in combination with a pressurized supply of fluid that is in a container removably attached to the frame. The container has a cylindrical outer wall with a central axis that is transverse to the first and second lines. The container is configured so that a hand of a user gripping the grasping portion of the frame can be extended at least partially around at least a portion of the cylindrical outer wall of the container.

In one form, the frame and container cooperatively define an “L” shape.

In one form, the frame defines an exhaust passage in communication with the fluid flow path with the valve element in the flow blocking position to allow discharge of fluid in the fluid flow path and thereby reduction in pressure of fluid in the fluid flow path.

In one form, with the valve element in the flow blocking position, the plunger is biasably urged into the first position.

In one form, the frame defines an inlet port for pressurized fluid from a supply. The valve element has a body with a central axis substantially parallel to the first line. The body has a main passage that defines a part of the fluid flow path extending along the central axis of the body and first and second feeder passages spaced along the central axis of the body. With the valve element in the flow blocking position, the first feeder passage communicates between the exhaust passage and the main passage of the body and the body blocks communication of pressurized fluid between the inlet port to the fluid flow path. With the valve element in the flow passage position, the second feeder passage communicates between the inlet port and the main passage and the valve body blocks communication of fluid in the fluid flow path to the exhaust passage.

In one form, there are threaded connector parts on the frame and container that cooperate to allow the container and frame to be relatively moved to selectively engage and disengage threads on the connector parts.

In another form, a tool for attaching a connector to a cable is provided. The tool has a frame and an operating mechanism on the frame that is operable by a pressurized fluid. The tool has a size and weight to be held by and transported in the hands of a user. The frame defines a receptacle for a connector with a first backing surface facing in a first direction and against which a connector can be placed with a cable in an operative position with respect to the connector. The operating mechanism has a plunger that is movable between a first position and a second position. The plunger is moved towards the backing surface and oppositely to the first direction as the plunger moves from the first position towards the second position. The frame defines a grasping portion that can be gripped in the hand of a user to hold the tool for operation. The tool further has an operator with a part that can be repositioned from a first position towards a second position to thereby release pressure from a pressurized source to cause the plunger to be moved from the first position into the second position.

In one form, the part is a trigger that is operable by a finger of a user on a hand that is gripping the grasping portion of the housing.

In one form, the combination further includes a supply of pressurized fluid that is attached to the frame. The supply of pressurized fluid includes a container that is removably connected to the frame.

In one form, the fluid is air.

In one form, the container has a cylindrical outer wall. The container is configured so that a hand of a user gripping the grasping portion of the housing can be extended at least partially around at least a portion of the cylindrical outer wall of the container.

In one form, the frame and container cooperatively define an “L” shape.

In another form, a tool for attaching a connector to a cable is provided. The tool has a frame and an operating mechanism on the frame that is operable by a pressurized fluid. The tool has a size and weight to be held by and transported in the hands of a user. The frame has structure for receiving a connector with a cable in an operative position with respect to the connector. The operating mechanism has a plunger structure for exerting a compressive force upon a connector at the receiving structure and structure for selectively: a) causing delivery of pressurized fluid from a pressurized fluid supply to cause the plunger structure to exert a compressive force upon a connector at the receiving structure; and b) blocking delivery of pressurized fluid from a pressurized fluid supply in a manner whereby the plunger structure does not exert a compressive force upon a connector at the receiving structure.

In one form, the tool further has structure attached to the frame for containing a supply of a pressurized fluid for operating the operating mechanism.

The invention is further directed to a method of operatively attaching a connector to a cable. The connector has a central axis and first and second parts that are movable relative to each other along the central axis of the connector between: i) a pre-assembly relationship; and ii) an assembled relationship. The method includes the steps of: providing a tool having a frame and an operating mechanism that is operable by a pressurized fluid, with the frame having a grasping portion; placing the connector in an installation position within a receptacle on the frame; placing a part of the cable in an operative position with respect to the connector; gripping the grasping portion of the frame; and with a finger on the one hand that is gripping the grasping portion of the frame, repositioning a trigger on the operating mechanism to thereby cause delivery of pressurized fluid that causes a plunger to relatively move the first and second connector parts from the pre-assembly relationship into the assembled relationship.

In one form, the method includes the step of placing a container with a pressurized supply of fluid upon the frame to follow movement of the frame.

In one form, the method includes the step of extending the user’s one hand at least partially around the container with the one hand extended around the grasping portion of the frame.

DETAILED DESCRIPTION OF THE DRAWINGS

Figure 1:
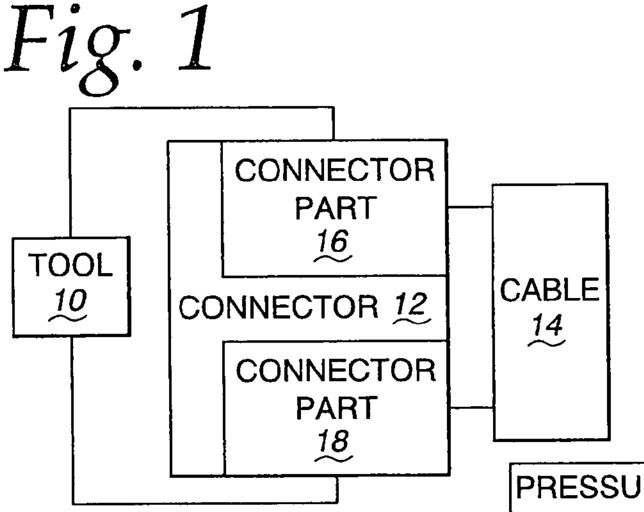
FIG. 1 is a schematic representation of a combination of a cable, a connector capable of being operably attached to the cable and including relatively moveable first and second parts, and a tool, according to the invention, for changing the first and second connector parts from a pre-assembly relationship into an assembled relationship to cause the connector to be maintained operatively attached to the cable.

Referring initially to FIG. 1, a tool, according to the present invention, is shown at 10 for attaching a connector 12 to a cable 14. More specifically, the tool 10 changes the relationship of first and second connector parts 16, 18, making up the connector 12, thereby to maintain the connector 12 operatively attached to the cable 14. The system shown in FIG. 1 is depicted schematically since the inventive tool 10 can be used in conjunction with connectors 12 taking a wide range of different forms.

Additionally, the tool 10 is shown in schematic form in FIG. 2 in that the components making up the tool 10 can vary significantly from the preferred form, as described hereinbelow. The schematic representation of each of the system in FIG. 1 and tool 10 in FIG. 2 is intended to encompass all variations that would be obvious from the teachings herein to one skilled in the art.

Figure 2:
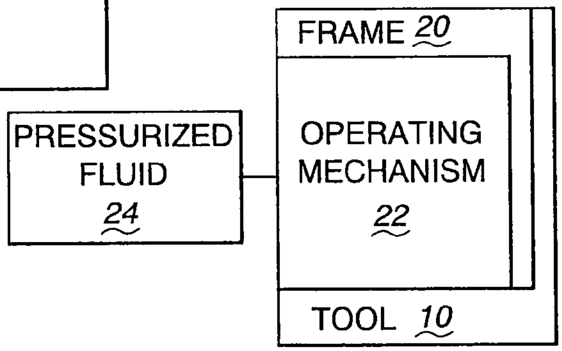
FIG. 2 is a schematic representation of the tool with a supply of pressurized fluid through which it is operated.
Figure 3:
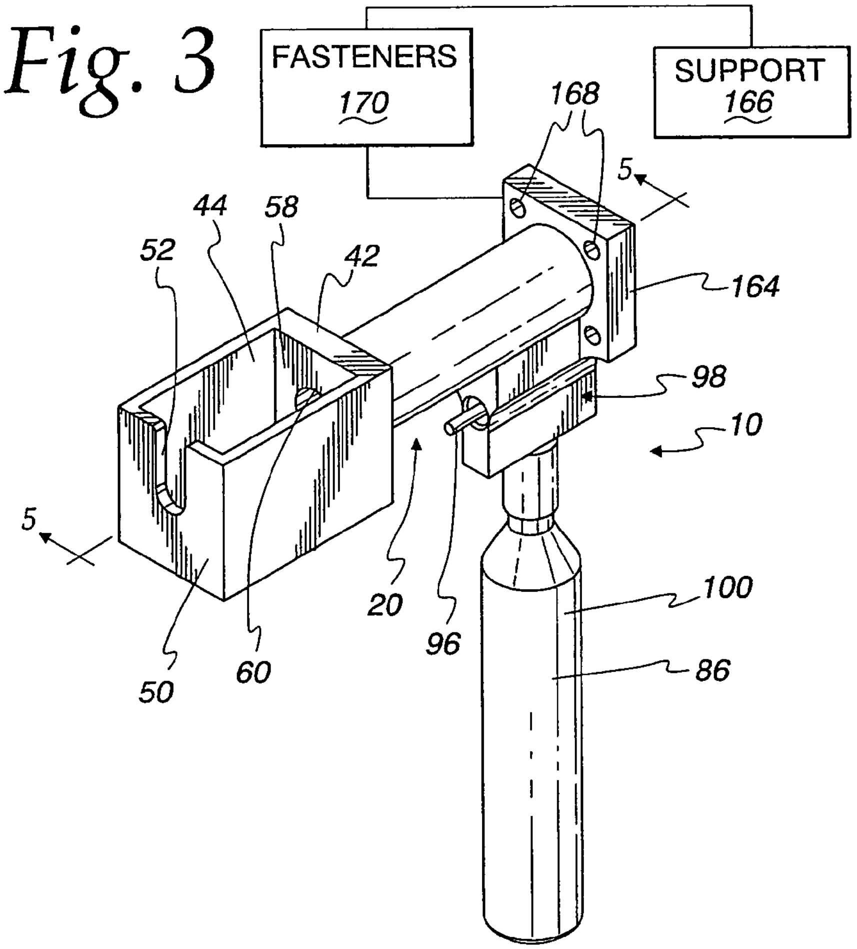
FIG. 3 is a perspective view of one form of tool, according to the present invention, and as schematically depicted in FIGS. 1 and 2.
Figure 4:
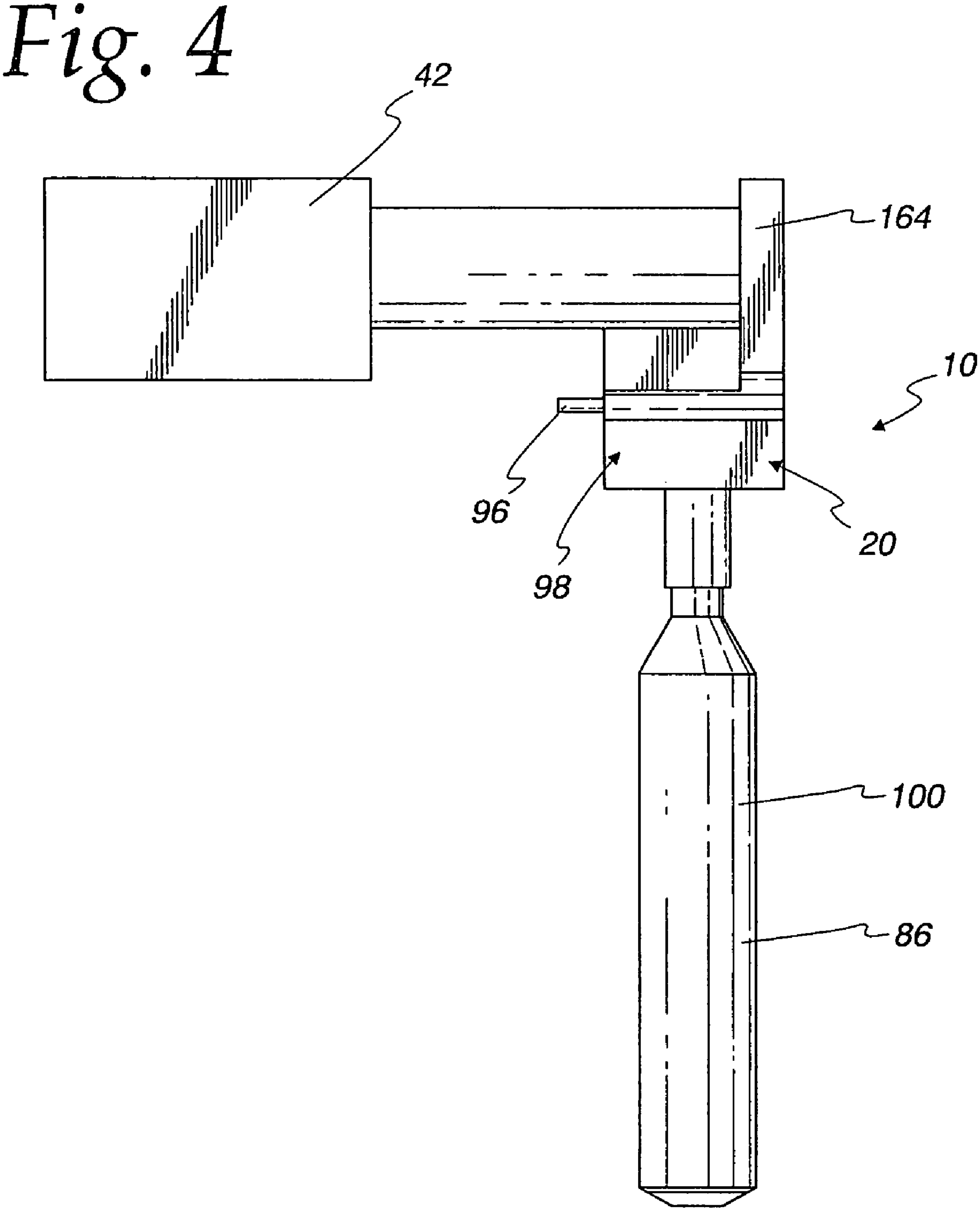
FIG. 4 is a side elevation view of the tool in FIG. 3.

As shown in FIG. 2, the tool 10 has a frame 20 into which an operating mechanism 22 is integrated. The operating mechanism 22 is operated/actuated by a pressurized fluid 24 that may be liquid and more preferably a gas, such as compressed air. A preferred form of the tool 10 will now be described with respect to FIGS. 3-9.

Figure 5:
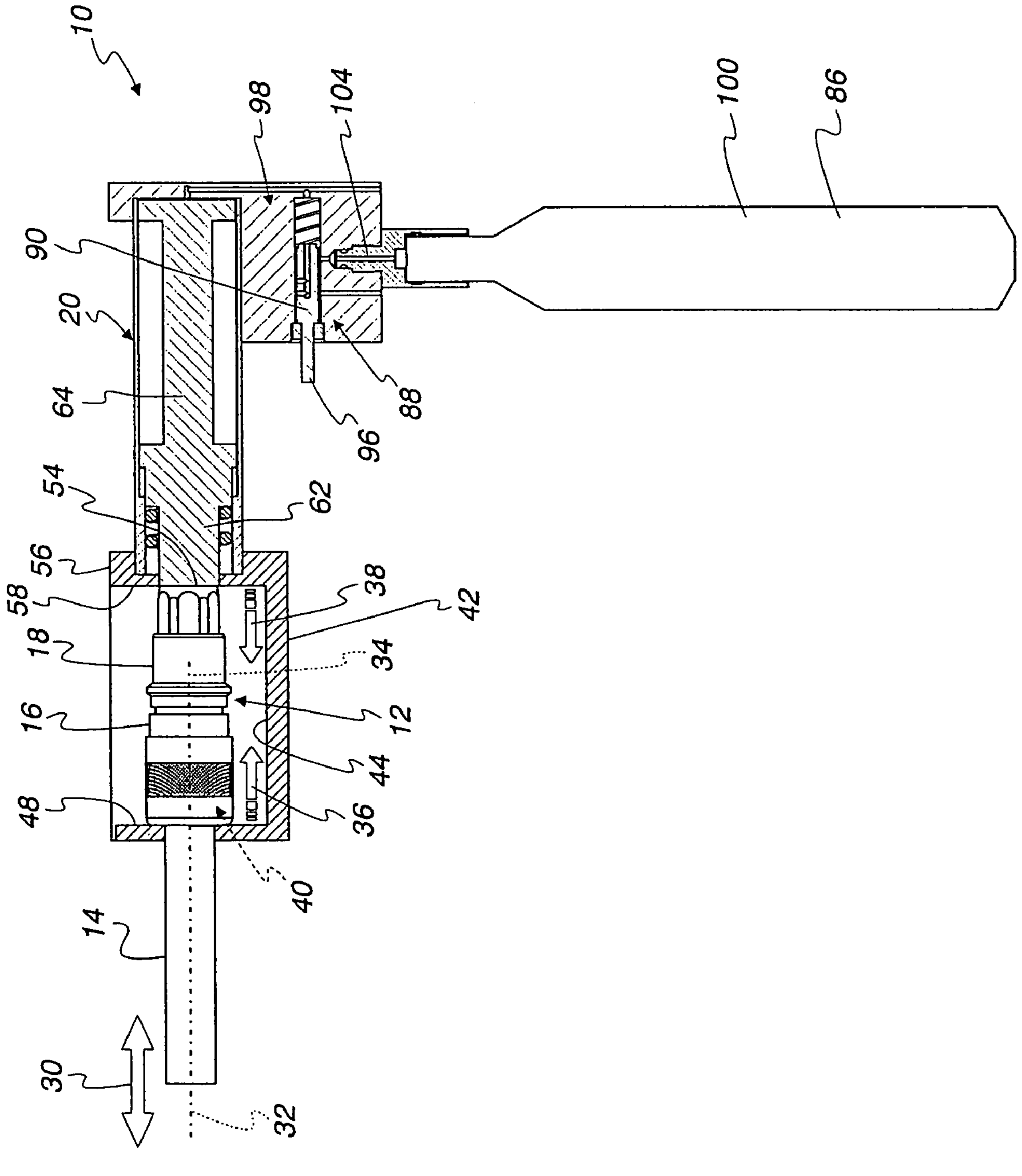
FIG. 5 is a cross-sectional view of the tool taken along line 5-5 of FIG. 3 with the cable in an operative position with respect to the connector, the connector in an installation position on the tool, and the connector parts in the pre-assembly relationship.
Figure 6:
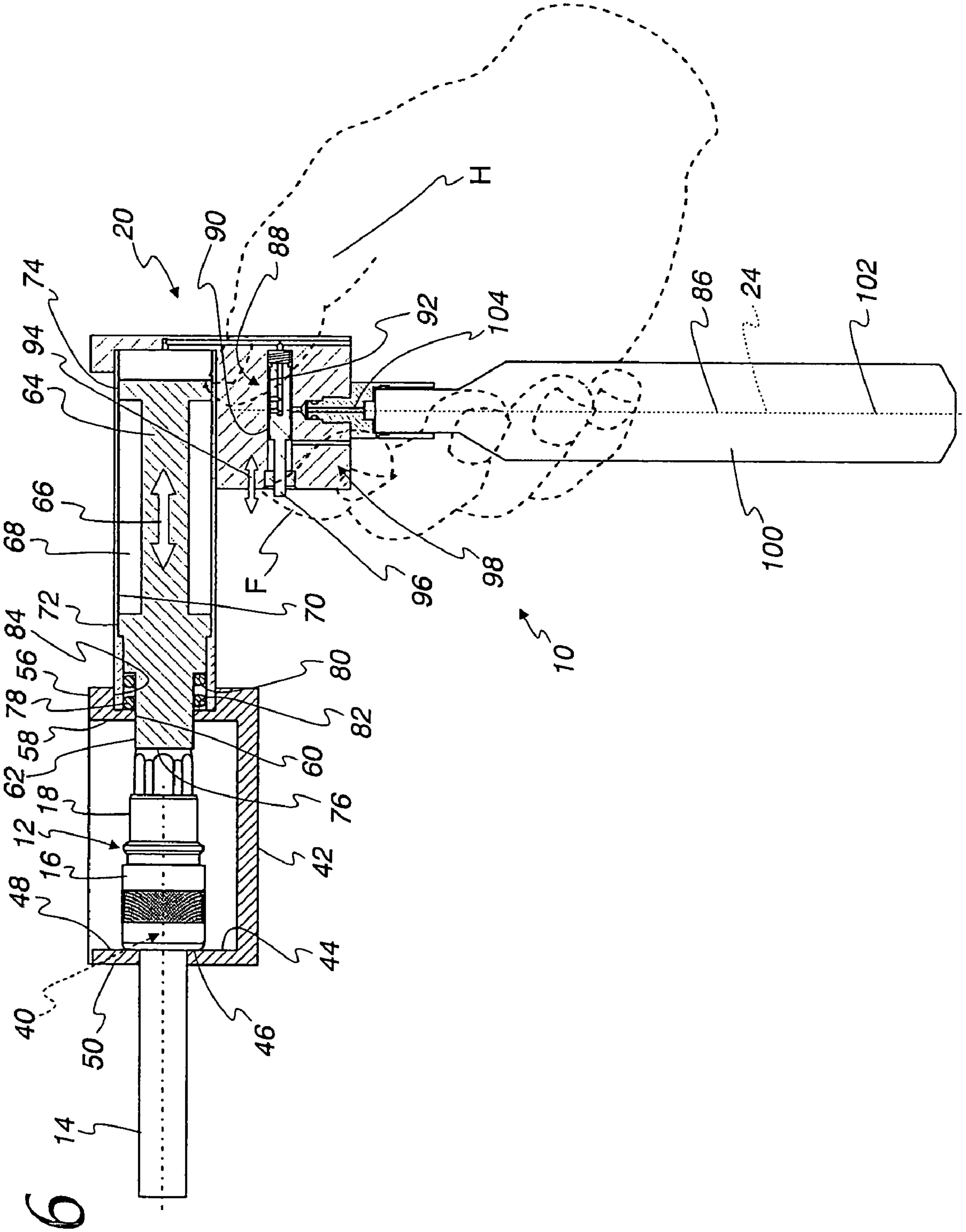
FIG. 6 is a view as in FIG. 5 wherein the tool is operated to change the connector parts into the assembled relationship.

The tool 10 is particularly suitable for operatively attaching the connector 12 to a coaxial cable 14 (FIGS. 5 and 6). The cable 14 has a length in the direction of the double-headed arrow 30 and a lengthwise central axis 32.

The connector 12 has a central axis 34 that is coincident with the axis 32 of the cable 14 with the connector 12 operatively attached to the cable 14 as in FIGS. 5 and 6. The first and second connector parts 16, 18, that make up the connector 12, are moveable relative to each other along the central axis 34 between a pre-assembly relationship, as shown in FIG. 5, and an assembled relationship, as shown in FIG. 6. Many different constructions for the connector 12 and its associated parts 16, 18 can be operably attachable to a cable using the tool 10. What is preferred is that the connector parts 16, 18, regardless of their form, be operatively attached to a cable by being repositioned axially towards each other, as indicated by the arrows 36, 38 in FIG. 5. As this occurs, a free end part 40 of the cable 14, that is axially overlapping with the connector 12 and resides within a portion thereof in an operative position, becomes firmly, fixedly held by the connector parts 16, 18, which are likewise fixed with respect to each other. The connector parts 16, 18 may be made with a corrugated or non-corrugated wall construction. One exemplary form of connector is shown in U.S. Pat. No. 6,153,830, the disclosure of which is incorporated herein by referenced.

The frame 20 has a squared component 42 defining a receptacle 44 in which one connector end 46 can bear against a backing surface 48 bounding the receptacle 44. The squared component 42 defines a means for receiving the connector 12 with the cable 14 in an operative position with respect thereto. The backing surface 48 is defined on a wall 50 that has a U-shaped cutout 52 to accept the diameter of the cable 14, whereby the connector 12 can be directed into the receptacle 14 and into the installation position shown in FIGS. 5 and 6.

The connector end 54, axially opposite to the connector end 46, is located adjacent to a wall 56 on the component 42, and more particularly in close proximity to a surface 58 thereon and facing oppositely to the backing surface 48.

The wall 56 has a through bore 60 through which a reduced diameter end 62 of a plunger 64, that is part of a plunger assembly, is moved along a first line as indicated by the double-headed arrow 66 in FIG. 6. The plunger assembly and squared component 42 together define a means for exerting a compressive force upon the connector 12. The plunger assembly could be made from multiple components, moving with or separately from the plunger 64, consistent with the teachings herein. The plunger 64 resides in a chamber 68 within the frame 20 bounded by an annular wall 70. The plunger 64 is generally "barbell"-shaped for weight reduction, with axially spaced, annular surfaces 72, 74 engaged with the annular wall 70 for guided movement thereagainst.

The plunger 64 is movable between a first position, as shown in FIG. 5, and a second position, as shown in FIG. 6. As an incident of this movement, a free end 76 of the plunger 64 moves correspondingly to axially compress the connector 12 against the backing surface 48, thereby to change the connector parts 16, 18 from their pre-assembly relationship into their assembled relationship. This causes the connector 12 to be maintained operatively attached to the cable 14.

The plunger 64 is normally biasably urged towards its first position. This is accomplished by interposing a compression coil spring 78 between an annular, axially facing shoulder 80 on the plunger 64 and a facing shoulder 82 formed by an annular undercut 84 on the wall 56. The coil spring 78 surrounds the reduced diameter end 62 of the plunger 64.

The operating mechanism 22, as previously noted, is actuated/operated by the pressurized fluid 24 from a supply thereof that may be separate from, or integrated into, the frame 20. In a preferred form, a supply of the pressurized fluid 24 is provided in a container 86 that is removably connected to the frame 20 and is transportable with the frame 20 as one unit. The container 86 is one exemplary form of a means for containing a pressurized supply of fluid to operate the tool operating mechanism 22.

Figure 7:
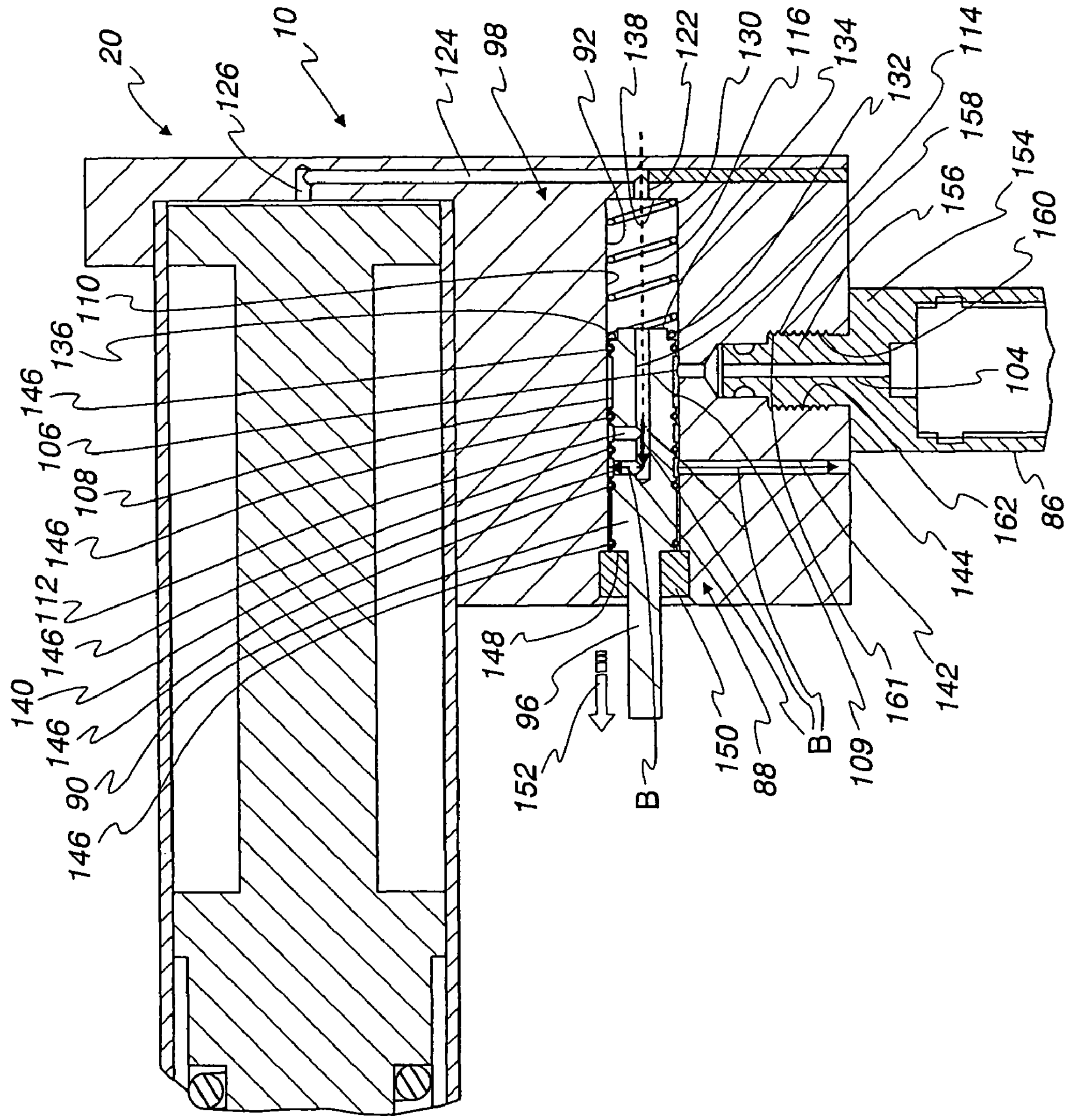
FIG. 7 is an enlarged, fragmentary view of the tool in cross section as in FIG. 5 and in a state corresponding to that shown in FIG. 5.
Figure 8:
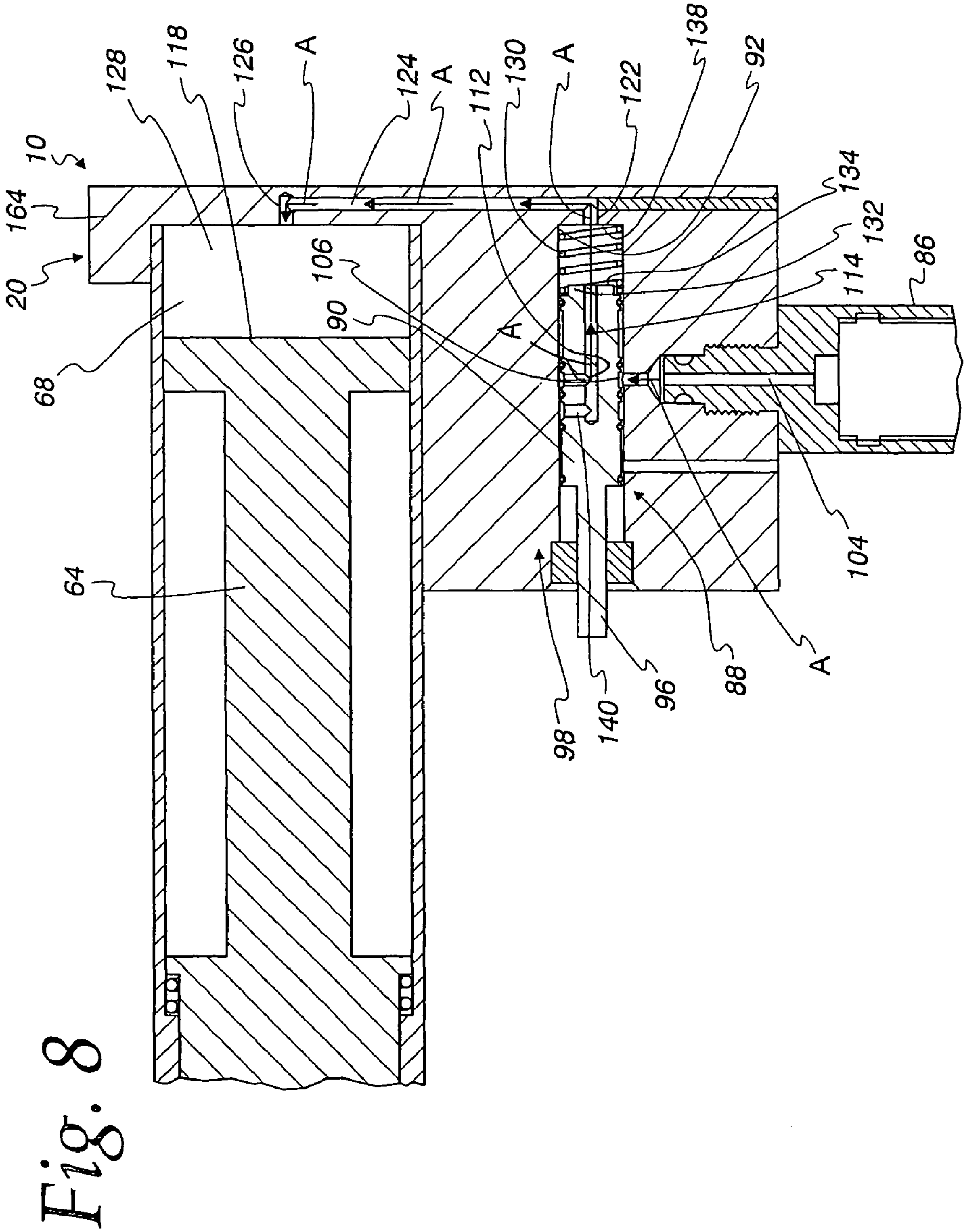
FIG. 8 is an enlarged, fragmentary view of the tool in cross section as in FIG. 5 and in a state corresponding to that shown in FIG. 6.

The actuation/operation of the tool 10 through the pressurized fluid 24 is effected through an operator/valve assembly 88 consisting of a valve element 90. The operator/valve assembly 88 and the flow network for guiding the flow of pressurized fluid together define a means for selectively: a) causing delivery of pressurized fluid from the supply thereof to cause the plunger assembly to exert a compressive force upon a connector 12 in the receptacle 44; and b) blocking delivery of pressurized fluid from the supply thereof in a manner whereby the plunger assembly does not exert a compressive force on a connector 12 in the receptacle 44. The valve element 90 is moveable guidingly within a passage 92 along a second line, as indicated by the double-headed arrow 94 in FIG. 6. The line of movement of the value element 90, indicated by the arrow 94, is substantially parallel to, but spaced from, the line of movement of the plunger 64, as indicated by the arrow 66. The valve element 90 is repositionable between a flow blocking position, as shown in FIGS. 5 and 7, and a flow passage position, as shown in FIGS. 6 and 8. The valve element 90 is repositioned through an exposed part 96 of the operator/valve assembly 88 that is in the form of a translatable trigger. The trigger 96 is repositionable from a first position, as shown in FIGS. 5 and 7, towards a second position, as shown in FIGS. 6 and 8, to change the valve element 90 respectively from its flow blocking position into its flow passage position. In this embodiment, the trigger 96 moves as one piece with the valve element 90.

The frame 20 has a grasping portion at 98 that can be gripped by one hand H of a user to hold the tool for operation, as shown in FIG. 6. The trigger 96 is operable by a finger F of a user on the hand H that is gripping the grasping portion 98 of the frame 20.

The container 86 has a cylindrical outer wall 100 with a central axis 102 that is transverse, and substantially orthogonal, to the lines of movement of the plunger 64 and valve element 90. The hand H of the user gripping the grasping portion 98 of the frame 20 can be extended additionally around at least a portion of the cylindrical outer wall 100 of the container 86 to establish a firmer and more comfortable hold on the tool 10.

As seen most clearly in FIGS. 3-6, the frame 20 and attached container 86 cooperatively define an "L" shape that can be conveniently grasped and transported by the user with a single hand situated as shown in FIG. 6. The tool 10 preferably has a size and weight to be conveniently held by, and transported in, the hand(s) of a user.

The flow of the pressurized operating fluid will now be described with the tool 10 in its multiple different states. With the container 86 attached to the frame 20, pressurized fluid in the container 86 communicates through a needle conduit 104 to a frame inlet port 106. With the trigger 96 in the first position of FIGS. 5 and 7, pressurized fluid is confined in an annular space 108, formed by an undercut 109, between the valve element 90 and a wall surface 110 bounding the passage 92. In this state, the plunger 64 is biased by the coil spring 78 to its first position shown in FIGS. 5 and 7.

By translating the trigger 96 to its second position, as shown in FIGS. 6 and 8, the inlet port 106 aligns axially with a feeder passage 112, on the valve element 90, that communicates the pressurized fluid radially to a blind bore 114 in the valve element 90. The blind bore 114 defines a main passage with a center that is substantially coincident with a central axis 116 (FIG. 7) that is common to both the valve element 90 and passage 92.

In this configuration, a fluid flow path is defined in the direction of the arrows A continuously to and from the inlet port 106 to against a force applying end 118 of the plunger 64. More particularly, the fluid flow path extends through the feeder passage 112, the main passage 114 and a portion of the passage 92. The flow path continues therefrom into a reduced diameter passage portion consisting of a first leg 122 extending along the axis 116 from the passage 92, a transverse leg 124, and a return leg 126 that communicates with the chamber 68. Fluid under pressure in the leg 126 exerts a force upon the force applying end 118 of the plunger 64. As the plunger 64 shifts, a sub-chamber 128, of increasing volume, is formed in which pressure buildup occurs. This pressure buildup effects the shifting of the plunger 64 from its first position into its second position against the force of the coil spring 78.

In the embodiment shown, a coil spring 130 surrounds a reduced diameter portion 132 at the axial end 134 of the valve element 90 and acts between a shoulder 136 at the end of the valve element 90 and a facing surface 138 at the axial end of the chamber 92. This coil spring 130 normally biases the valve element 90 into its flow blocking position, as shown in FIGS. 7 and 9.

Figure 9:
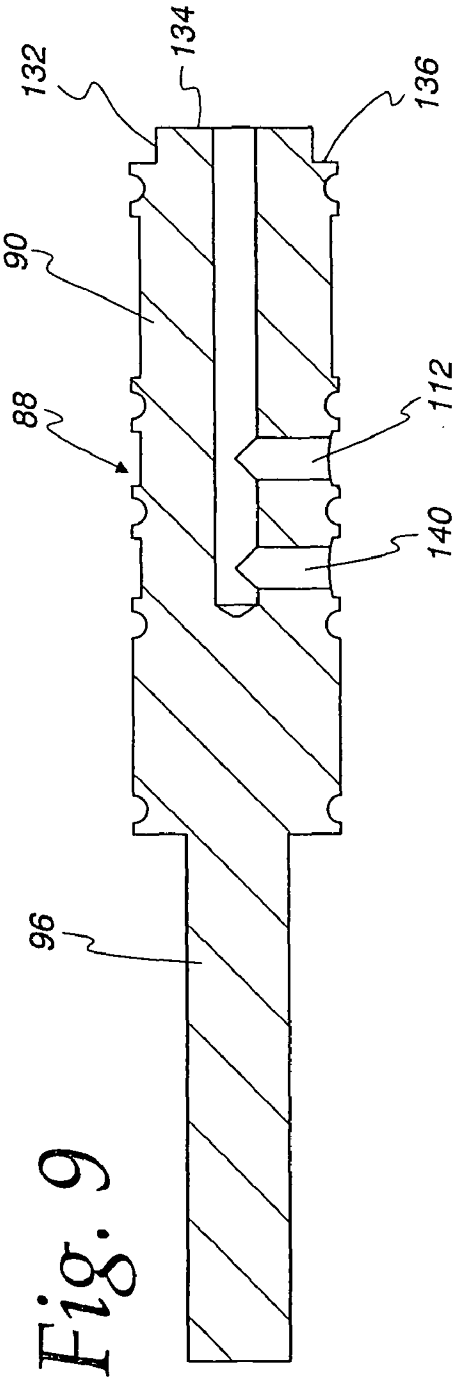
FIG. 9 is an enlarged, elevation view of a valve element on the tool in FIGS. 3-9.

In the flow blocking position of FIGS. 7 and 9, a separate feeder passage 140, spaced axially from the feeder passage 112, aligns axially over an exhaust passage 142 that communicates to an outlet 144 on the frame 20. Fluid pressure buildup in the flow path/passage 92 is relieved by communicating fluid in the direction of the arrows B in FIG. 7 through the main passage 114, the feeder passage 140 and the exhaust passage 142 and to and from the outlet 144.

A series of seated, sealing O-rings 146 surrounds the valve element 90 and is each captive between the valve element 90 and wall surface 110 bounding the passage 92 to prevent axial communication of fluid, from a location radially outside of the valve element 90, between the feeder passages 112, 140 and annular space 108. The O-rings 146 also prevent axial passage of fluid between the valve element 90 and wall surface 110 at the axial ends 134, 148 thereof within the passage 92.

A bushing 150 is pressed into the frame 20 in surrounding relationship with the trigger 96 and abuts the valve element end 148 to limit axial shifting thereof in the direction of the arrow 152 relative to the frame 20 under the force of the spring 130.

To facilitate connection and disconnection of the container 86, an adapter 154 is provided. The adapter 154 defines a stepped diameter connector part 156 with external threads 158. The adapter 154 fits within a complimentarily-shaped stepped bore 160 in the frame 20 that defines a connector part 161 to cooperate with the connector part 156. The connector part 161 has internal threads 162 to mate with the external threads 158 on the adapter 154. By relatively turning the container 86 and frame 20 around the axis 102, threads on the container 86 and frame 20 can be selectively engaged and disengaged to thereby selectively attach and separate the container 86.

The frame 20 also includes a mounting plate 164 through which the frame 20 can be secured to a support 166 (FIG. 3), if portability is not required or desired. That is, the tool 10 can be operated with the tool 10 fixed relative to the support 166. The mounting plate 164 has bores 168 to accept conventional fasteners 170 that can be directed therethrough into the support 166.

Figure 10:
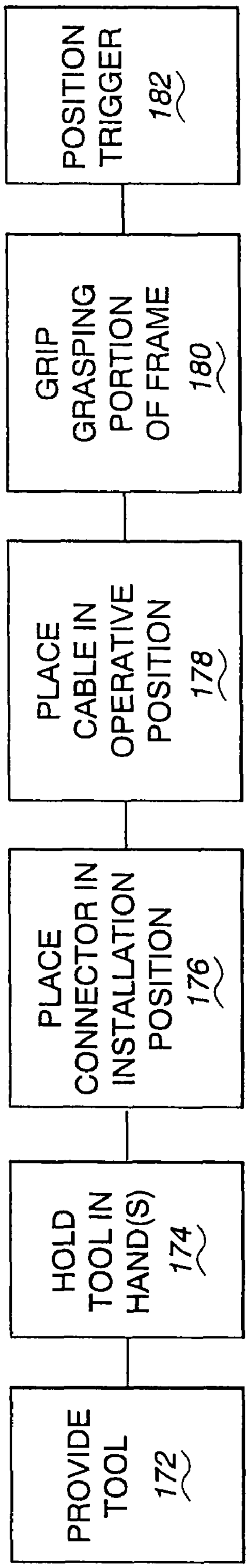
FIG. 10 is a flow diagram representation of a method for operatively attaching a connector to a cable, according to the present invention.

With the structure described above, the following method can be carried out to attach the connector 12 to the cable 14. As seen in FIG. 10 at block 172, a tool is provided having a frame and an operating mechanism that is operable by a pressurized fluid. As shown at block 174, the tool is held in the user's hand or hands. As shown at block 176, a connector is placed in the installation position within the frame receptacle. As shown at block 178, a part of the cable is placed in an operative position with respect to the connector. As shown at block 180, the grasping portion of the frame is gripped by a user's hand. As shown at block 182, the trigger is repositioned with the finger on the user's one hand that is gripping the grasping portion of the frame to thereby cause delivery of pressurized fluid that causes a plunger to relatively move the first and second connector parts from the pre-assembly relationship into the assembled relationship.

The tool 10 can be designed, by those skilled in this art, to produce the compressive force necessary for a particular application. The fluid may be controllably delivered with a variable pressure through the valve assembly 88 or another control (not shown). Alternatively, the tool 10 may be operated to produce fluid pressure at one or more predetermined, selected levels to consistently and predictably attach the connectors 12.

The foregoing disclosure of specific embodiments is intended to be illustrative of the broad concepts comprehended by the invention.

The invention claimed is:

1. A tool for connecting a coaxial cable connector to a coaxial cable, the coaxial cable connector having a central axis and first and second parts that are movable relative to each other along the central axis of the connector between: i) a pre-assembly relationship; and ii) an assembled relationship, the tool having a size and weight to be held and transported in the hands of a user and comprising:

a frame defining a receptacle for the connector with the connector in an installation position and a part of the cable placed in an operative position with respect to the connector; and an operating mechanism on the frame comprising a plunger that is movable between a first position and a second position to thereby change the first and second parts of the connector in the installation position from the pre-assembly relationship into the assembled relationship, the operating mechanism actuated by a pressurized fluid from a container removably connected to the frame, wherein the frame defines a grasping portion that can be gripped in the hand of a user to hold the tool for operation and an operator having a part that can be repositioned from a first position towards a second position to thereby release fluid from the pressurized supply to cause the plunger to be moved from its first position towards its second position.

2. The tool for connecting a coaxial cable connector to a coaxial cable according to claim 1 wherein the part comprises a trigger that is translated along a line between its first and second positions and the trigger is operable by a finger of a user on a hand that is gripping the grasping portion of the frame.

3. A tool for connecting a coaxial cable connector to a coaxial cable, the coaxial cable connector having a central axis and first and second parts that are movable relative to each other along the central axis of the connector between: i) a pre-assembly relationship; and ii) an assembled relationship, the tool having a size and weight to be held and transported in the hands of a user and comprising:

a frame defining a receptacle for the connector with the connector in an installation position and a part of the cable placed in an operative position with respect to the connector; and an operating mechanism on the frame comprising a plunger that is movable between a first position and a second position to thereby change the first and second parts of the connector in the installation position from the pre-assembly relationship into the assembled relationship, the operating mechanism actuated by a pressurized fluid from a container removably connected to the frame, wherein the frame defines a chamber within which the plunger is guided in movement along a first line between its first and second positions and the frame defines a fluid flow path between a pressurized supply of the fluid and a force applying end on the plunger.

4. The tool for connecting a coaxial cable connector to a coaxial cable according to claim 3 wherein the operating mechanism further comprises a valve assembly that controls passage of fluid from a pressurized supply of the fluid to the force applying end of the plunger.

5. The tool for connecting a coaxial cable connector to a coaxial cable according to claim 4 wherein the valve assembly comprises a valve element that is movable between a flow blocking position and a flow passage position, the valve element movable by a user through a trigger that is engagable and repositionable by a user to thereby move the valve element from the flow blocking position into the flow passage position.

6. The tool for connecting a coaxial cable connector to a coaxial cable according to claim 5 wherein the trigger moves as one piece with the valve element.

7. The tool for connecting a coaxial cable connector to a coaxial cable according to claim 6 wherein the valve element is translatable between the flow blocking and flow passage positions along a second line that is substantially parallel to and spaced from the first line.

8. The tool for connecting a coaxial cable connector to a coaxial cable according to claim 7 wherein the frame defines a grasping portion that can be gripped in a hand of a user to hold the tool for operation, the trigger situated to be operable by a finger of a user on a hand that is gripping the grasping portion of the housing.

9. The tool for connecting a coaxial cable connector to a coaxial cable according to claim 8 further in combination with a pressurized supply of fluid that is in a container removably attached to the frame, the container having a cylindrical outer wall with a central axis that is transverse to the first and second lines, the container configured so that a hand of a user gripping the grasping portion of the frame can be extended at least partially around at least a portion of the cylindrical outer wall of the container.

10. The tool for connecting a coaxial cable connector to a coaxial cable according to claim 5 wherein the frame defines an exhaust passage in communication with the fluid flow path with the valve element in the flow blocking position to allow discharge of fluid in the fluid flow path and thereby reduction in pressure of fluid in the fluid flow path.

11. The tool for connecting a coaxial cable connector to a coaxial cable according to claim 10 wherein with the valve element in the flow blocking position, the plunger is biasably urged into the first position.

12. The tool for connecting a coaxial cable connector to a coaxial cable according to claim 10 wherein the frame defines an inlet port for pressurized fluid from a supply, the valve element comprises a body with a central axis substantially parallel to the first line, the body having a main passage that defines a part of the fluid flow path extending along the central axis of the body and first and second feeder passages spaced along the central axis of the body, with the valve element in the flow blocking position the first feeder passage communicates between the exhaust passage and the main passage of the body and the body blocks communication of pressurized fluid between the inlet port to the fluid flow path, and wherein with the valve element in the flow passage position, the second feeder passage communicates between the inlet port and the main passage and the valve body blocks communication of fluid in the fluid flow path to the exhaust passage.

13. A tool for connecting a coaxial cable connector to a coaxial cable, the coaxial cable connector having a central axis and first and second parts that are movable relative to each other along the central axis of the connector between: i) a pre-assembly relationship; and ii) an assembled relationship, the tool having a size and weight to be held and transported in the hands of a user and comprising:

a frame defining a receptacle for the connector with the connector in an installation position and a part of the cable placed in an operative position with respect to the connector; and an operating mechanism on the frame comprising a plunger that is movable between a first position and a second position to thereby change the first and second parts of the connector in the installation position from the pre-assembly relationship into the assembled relationship, the operating mechanism actuated by a pressurized fluid from a container removably connected to the frame, the tool further provided in combination with a container for a supply of pressurized fluid that is air, the container removably connected to the frame.

14. A tool for connecting a coaxial cable connector to a coaxial cable, the coaxial cable connector having a central axis and first and second parts that are movable relative to each other along the central axis of the connector between: i) a pre-assembly relationship; and ii) an assembled relationship, the tool having a size and weight to be held and transported in the hands of a user and comprising:

a frame defining a receptacle for the connector with the connector in an installation position and a part of the cable placed in an operative position with respect to the connector; and an operating mechanism on the frame comprising a plunger that is movable between a first position and a second position to thereby change the first and second parts of the connector in the installation position from the pre-assembly relationship into the assembled relationship, the operating mechanism actuated by a pressurized fluid from a container removably connected to the frame, wherein the frame and container cooperatively define an "L" shape.

15. A tool for connecting a coaxial cable connector to a coaxial cable, the coaxial cable connector having a central axis and first and second parts that are movable relative to each other along the central axis of the connector between: i) a pre-assembly relationship; and ii) an assembled relationship, the tool having a size and weight to be held and transported in the hands of a user and comprising:

a frame defining a receptacle for the connector with the connector in an installation position and a part of the cable placed in an operative position with respect to the connector; and an operating mechanism on the frame comprising a plunger that is movable between a first position and a second position to thereby change the first and second parts of the connector in the installation position from the pre-assembly relationship into the assembled relationship, the operating mechanism actuated by a pressurized fluid from a container removably connected to the frame, the tool provided in combination with a container for a supply of pressurized fluid that is removably connected to the frame, wherein there are threaded connector parts on the frame and container that cooperate to allow the container and frame to be relatively moved to selectively engage and disengage threads on the connector parts.

16. A tool for attaching a connector to a cable, the tool comprising:

a frame; and an operating mechanism on the frame that is operable by a pressurized fluid, the tool having a size and weight to be held by and transported in the hands of a user, the frame defining a receptacle for a connector with a first backing surface facing in a first direction and against which a connector can be placed with a cable in an operative position with respect to the connector, the operating mechanism comprising a plunger that is movable between a first position and a second position, the plunger moved towards the backing surface and oppositely to the first direction as the plunger moves from the first position towards the second position, the frame defining a grasping portion that can be gripped in the hand of a user to hold the tool for operation, the tool further comprising an operator having a part that can be repositioned from a first position towards a second position to thereby release pressure from a pressurized source to cause the plunger to be moved from the first position into the second position.

17. The tool for attaching a connector to a cable according to claim 16 wherein the part comprises a trigger that is operable by a finger of a user on a hand that is griping the grasping portion of the housing.

18. The tool for attaching a connector to a cable according to claim 17 in combination with a supply of pressurized fluid that is attached to the frame, the supply of pressurized fluid comprising a container that is removably connected to the frame.

19. The tool for attaching a connector to a cable according to claim 18 wherein the fluid is air.

20. The tool for attaching a connector to a cable according to claim 18 wherein the container has a cylindrical outer wall, the container configured so that a hand of a user gripping the grasping portion of the housing can be extended at least partially around at least a portion of the cylindrical outer wall of the container.

21. The tool for attaching a connector to a cable according to claim 20 wherein the frame and container cooperatively define an "L" shape.

22. A tool for attaching a connector to a cable, the tool comprising:

a frame; and an operating mechanism on the frame that is operable by a pressurized fluid, the tool having a size and weight to be held by and transported in the hands of a user, the frame comprising means for receiving a connector with a cable in an operative position with respect to the connector, the operating mechanism comprising:

plunger means for exerting a compressive force upon a connector at the receiving means; and means for selectively a) causing delivery of pressurized fluid from a pressurized fluid supply to cause the plunger means to exert a compressive force upon a connector at the receiving means; and b) blocking delivery of pressurized fluid from a pressurized fluid supply in a manner whereby the plunger means does not exert a compressive force upon a connector at the receiving means.

23. The tool for attaching a connector to a cable according to claim 22 wherein the tool further comprises means attached to the frame for containing a supply of a pressurized fluid for operating the operating mechanism.

* * * * *